United States Patent
Sung et al.

(10) Patent No.: US 9,277,035 B2
(45) Date of Patent: Mar. 1, 2016

(54) RELEASING MECHANISM FOR HOUSING OF PORTABLE ELECTRONIC DEVICE

(71) Applicant: Chiun Mai Communication Systems, Inc., New Taipei (TW)

(72) Inventors: Fu-Hsin Sung, New Taipei (TW); Chia-Ju Lin, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 232 days.

(21) Appl. No.: 14/017,463

(22) Filed: Sep. 4, 2013

(65) Prior Publication Data

US 2014/0293535 A1    Oct. 2, 2014

(30) Foreign Application Priority Data

Mar. 26, 2013  (TW) .............................. 102110595 A

(51) Int. Cl.
| | |
|---|---|
| H04M 1/02 | (2006.01) |
| G06F 1/16 | (2006.01) |
| H01M 2/10 | (2006.01) |
| E05B 63/24 | (2006.01) |
| E05C 19/06 | (2006.01) |

(52) U.S. Cl.
CPC ........... H04M 1/0262 (2013.01); E05B 63/248 (2013.01); E05C 19/06 (2013.01); G06F 1/1635 (2013.01); G06F 1/1656 (2013.01); G06F 1/1679 (2013.01); H01M 2/1022 (2013.01); H04M 1/0249 (2013.01); Y10T 292/104 (2015.04)

(58) Field of Classification Search
CPC .. G06F 1/1656; G06F 1/1635; H01M 2/1066; H01M 2/1022; H04M 1/0262

USPC ........ 455/575.8; 361/679.55, 679.56, 679.58; 429/97

See application file for complete search history.

(56) References Cited

U.S. PATENT DOCUMENTS

| | | | | |
|---|---|---|---|---|
| 4,146,682 | A | * | 3/1979 | Nakao .............................. 429/97 |
| 5,039,580 | A | * | 8/1991 | Mori et al. ...................... 429/97 |
| 5,621,618 | A | * | 4/1997 | Komiyama ................... 361/732 |
| 5,642,404 | A | * | 6/1997 | Hsu ............................ 455/575.1 |
| 5,716,730 | A | * | 2/1998 | Deguchi .......................... 429/97 |
| 5,777,316 | A | * | 7/1998 | Horie et al. ................... 235/486 |
| 8,142,924 | B2 | * | 3/2012 | Dong ............................ 429/175 |
| 8,361,643 | B2 | * | 1/2013 | Ng .................................. 429/97 |
| 2006/0166083 | A1 | * | 7/2006 | Zhang et al. ..................... 429/97 |
| 2007/0026297 | A1 | * | 2/2007 | Qin et al. ......................... 429/97 |

(Continued)

FOREIGN PATENT DOCUMENTS

| | | |
|---|---|---|
| JP | 58-000704 | 1/1983 |
| JP | 03-005878 | 1/1991 |

(Continued)

Primary Examiner — Adrian S Wilson
(74) Attorney, Agent, or Firm — Novak Druce Connolly Bove + Quigg LLP

(57) ABSTRACT

A portable electronic device includes a first housing, a second housing detachably latched to the first housing through a latching tab, and a releasing mechanism. The releasing mechanism includes a button, an elastic member, and a shaft. The button surrounds the shaft and is rotatably assembled to the first housing by the shaft. The elastic member is coiled around the shaft and elastically resists the button to apply an elastic force to enable the button resisting the first housing. When the button rotates about the shaft under a pressure overcoming the elastic force, the latching tab is pushed to release the latching tab and the second housing.

7 Claims, 6 Drawing Sheets

(56) References Cited

U.S. PATENT DOCUMENTS

| | | | |
|---|---|---|---|
| 2007/0026299 A1* | 2/2007 | Park et al. | 429/97 |
| 2007/0238013 A1* | 10/2007 | Liu | 429/97 |
| 2008/0042448 A1* | 2/2008 | Ge et al. | 292/137 |
| 2009/0279249 A1* | 11/2009 | Crippen et al. | 361/679.58 |
| 2010/0081045 A1* | 4/2010 | Li | 429/100 |
| 2010/0092847 A1* | 4/2010 | Li | 429/97 |
| 2010/0151305 A1* | 6/2010 | Ouyang | 429/97 |
| 2011/0304960 A1* | 12/2011 | Lu | 361/679.01 |
| 2012/0044654 A1* | 2/2012 | Hsiu et al. | 361/747 |

FOREIGN PATENT DOCUMENTS

| | | |
|---|---|---|
| JP | 2002-158460 A | 12/2003 |
| JP | 2012-064736 A | 9/2013 |

* cited by examiner

RELEASING MECHANISM FOR HOUSING OF PORTABLE ELECTRONIC DEVICE

BACKGROUND

1. Technical Field

The present disclosure relates to releasing mechanisms, and particularly to a releasing mechanism for releasing a latch between a first housing and a second housing of portable electronic devices.

2. Description of Related Art

Portable electronic devices such as mobile phones, laptops and personal digital assistants (PDAs) incorporate housings, such as battery covers and antenna caps. These housings may be assembled to each other by snap fasteners. However, engagement between these housings can be too firm to be easily undone.

Therefore, there is room for improvement within the art.

BRIEF DESCRIPTION OF THE DRAWINGS

Many aspects of the embodiments can be better understood with reference to the drawings. The components in the drawings are not necessarily drawn to scale, the emphasis instead being placed upon clearly illustrating the principles of the exemplary releasing mechanism and portable electronic device using the releasing mechanism. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
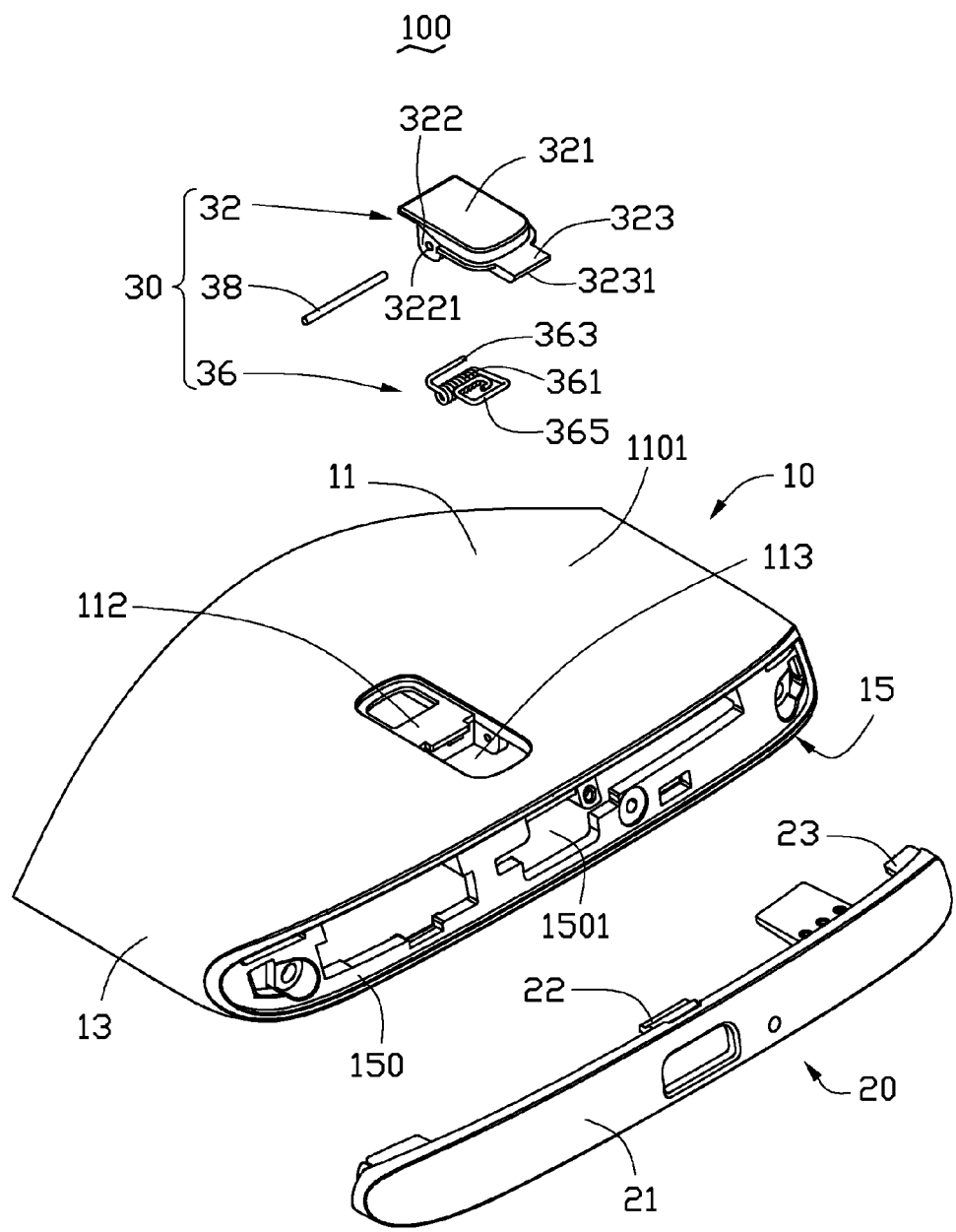
FIG. 1 is an exploded view of one embodiment of a releasing mechanism used in a portable electronic device.
Figure 2:
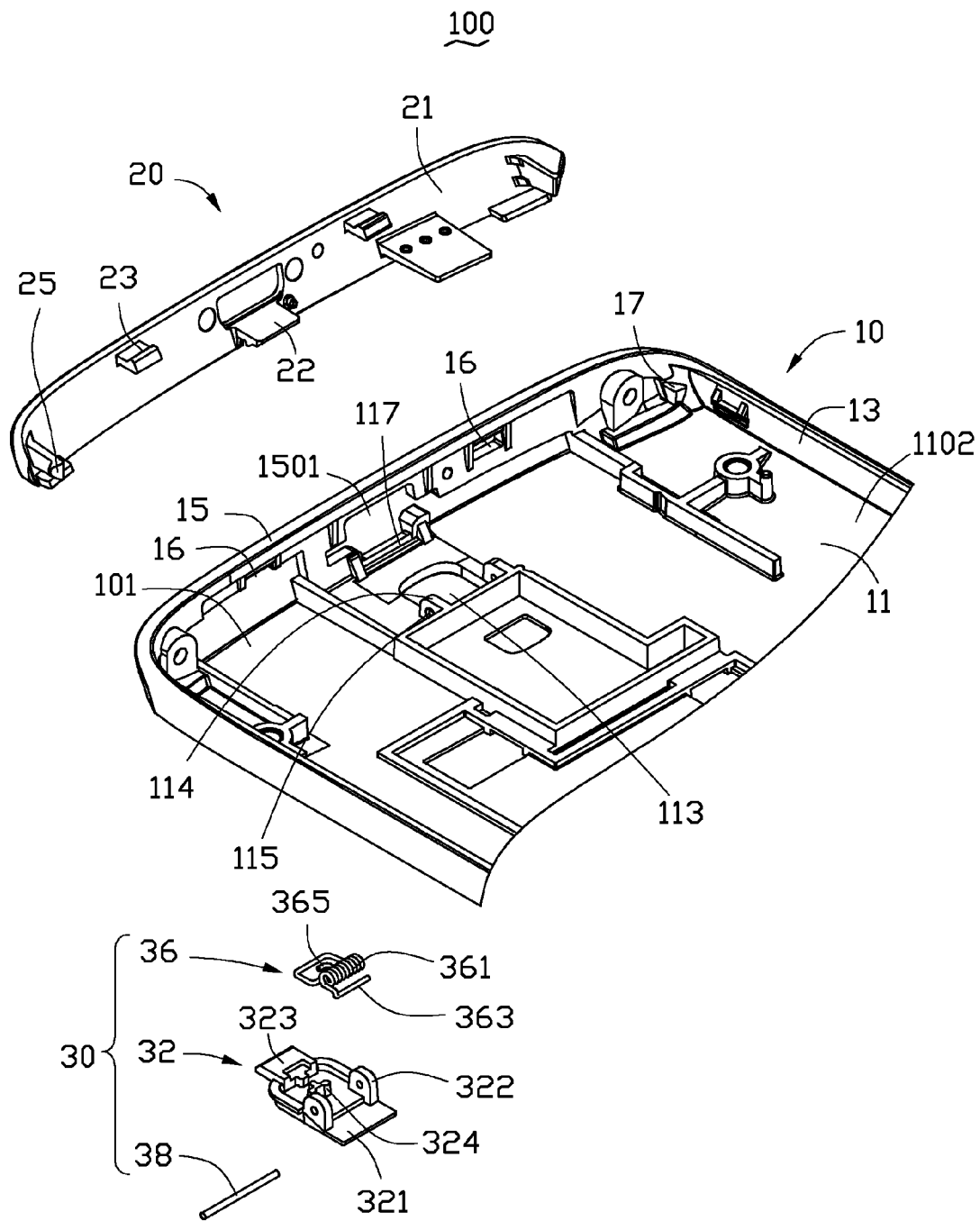
FIG. 2 is similar to FIG. 1, but viewed form another angle.
Figure 3:
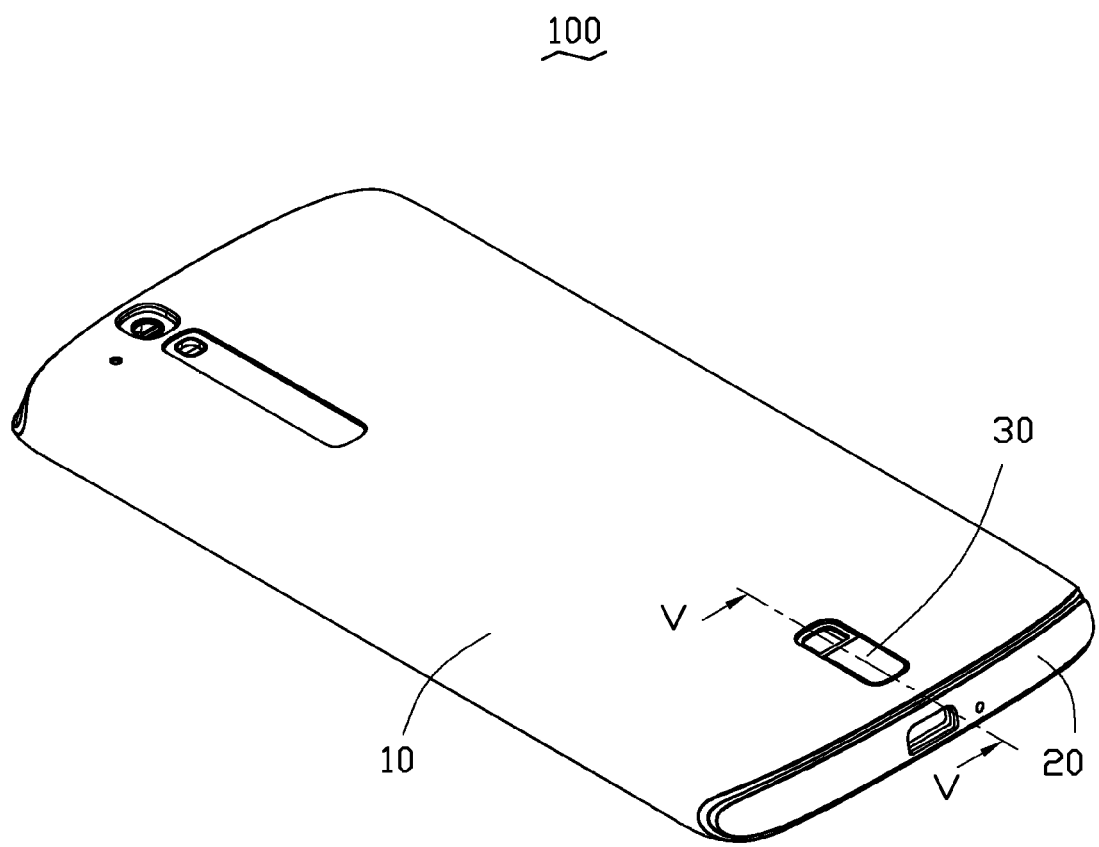
FIG. 3 is an assembled, schematic view of the portable electronic device of FIG. 1.

FIGS. 1 and 2 show an exemplary embodiment of a releasing mechanism 30 used in a portable electronic device 100, such as a mobile phone, or a tablet computer.

The portable electronic device 100 includes a first housing 10, a second housing 20, and the releasing mechanism 30. The second housing 20 is secured to the first housing 10 by the releasing mechanism 20.

The first housing 10 includes a bottom wall 11, two opposite sidewalls 13, and an end wall 15. The two opposite sidewalls 13 and the end wall 15 are connected to a peripheral edge of the bottom wall 11. The bottom wall 11, the two opposite sidewalls 13, and the end wall 15 cooperatively define an accommodating space 101 for receiving elements, circuit boards for example, of the portable electronic device 100.

An outer surface 1101 of the bottom wall 11 away from the accommodating space 101 defines an assembling recess 112 adjacent to the end wall 15. A hole 113 is defined in a bottom of the assembling recess 112. The hole 113 is a through hole and is adjacent to the end wall 15. Two opposite protruding blocks 114 protrude from an inner surface 1102 of the bottom wall 11 and are positioned at two opposite sides of the hole 113. Each protruding block 114 defines a first axle hole 115.

A protruding bar 117 protrudes from the inner surface 1102 of the bottom wall 11 and is proximately adjacent to the end wall 15. The protruding bar 117 is positioned between the assembling recess 112 and the end wall 15 and is substantially parallel to the end wall 15.

The end wall 15 defines a receiving recess 150 in an outer surface for receiving the second housing 20. A substantially center portion of a bottom of the receiving recess 150 defines an opening 1501. The opening 1501 can be configured for allowing a connector assembled in the portable electronic device 100 to be exposed. Two latching holes 16 are defined in the end wall 15 and are located at two sides of the opening 1501. Two latching blocks 17 protrude from an inner surface of the end wall 15 and are located at two ends of the end wall 15.

Figure 5:
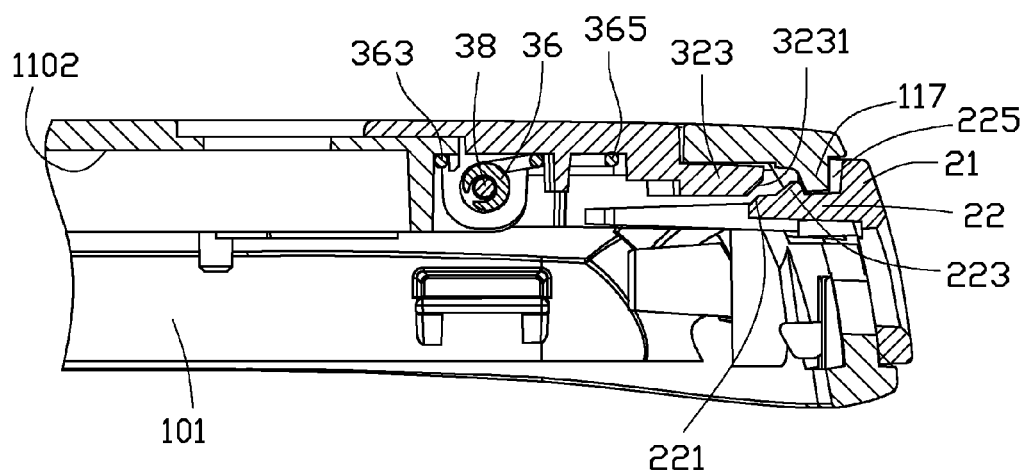
FIG. 5 is a cross-sectional view of the portable electronic device of FIG. 3 taken alone line V-V.

The second housing 20 includes a main body 21, a latching tab 22, two first hooks 23, and two second hooks 25. The latching tab 22, the two first hooks 23, and the two second hooks 25 all protrude from the same side of the main body 21. The main body 21 is to be received in the receiving recess 150. The latching tab 22 is located at a position corresponding to the protruding bar 117. FIG. 5 shows that a distal end of the latching tab 22 has a first slanted surface 221. A protrusion 223 protrudes from a middle position of the latching tab 22, thereby forming a concave portion 225 between the protrusion 223 and the main body 21. The protruding bar 117 is detachably latched in the concave portion 225. The two first hooks 23 are located at positions corresponding to the two latching holes 16. The two second hooks 25 are located at positions corresponding to the two latching blocks 17.

Figure 4:
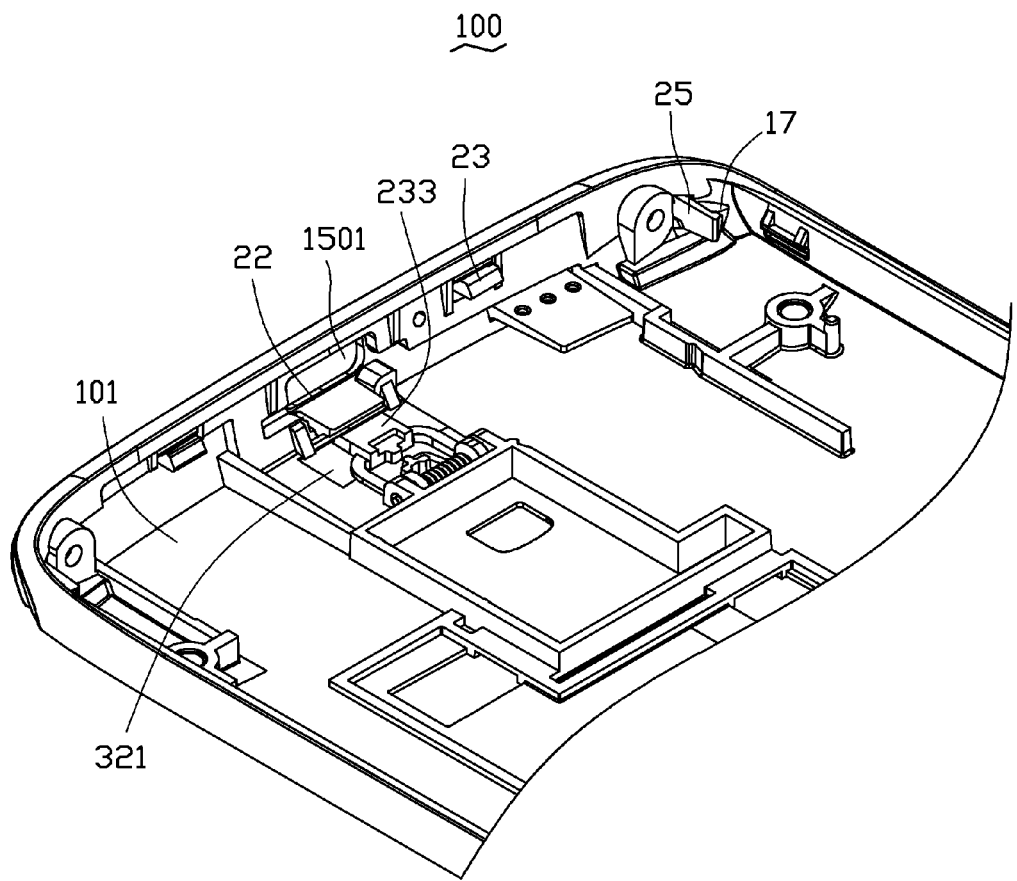
FIG. 4 is similar to FIG. 3, but viewed from another angle.

FIGS. 4 and 5 show that when the second housing 20 is assembled to the first housing 10, the main body 21 is received in the receiving recess 150, the latching tab 22 is inserted into the accommodating space 101 through the opening 1501 with the protrusion 223 resisting against the protruding bar 117. The two first hooks 23 are inserted through the two latching holes 16 to clasp the inner surface of the end wall 15. The two second hooks 25 are inserted into the accommodating space 101 to be latched by the two latching blocks 17.

The second housing 20 is made of an elastic material, such as plastic, as such, the latching tab 22, the two first hooks 23, and the two second hooks 25 are capable of elastically deforming.

The releasing mechanism 30 includes a button 32, an elastic member 36, and a shaft 38. The button 32 includes a main portion 321, two opposite projecting blocks 322, a flange 323, and a projection 324. The main portion 321 is to be assembled to the assembling recess 112 of the first housing 10. The two projecting blocks 322 protrude perpendicularly from two edges of the main portion 321 and each defines a second axle hole 3221. The flange 323 extends longitudinally from an end of the main portion 321. A free end of the flange 323 has a second slanted surface 3231 engaged with the first slanted surface 221 of the latching tab 22. The projection 324 projects from a position between the flange 323 and the two projecting blocks 322.

In this embodiment, the elastic member 36 is a torsion spring and includes a spiral portion 361, a first resisting arm 363 connected to an end of the spiral portion 361, and a second resisting arm 365 connected to another end of the spiral portion 361. The second resisting arm 365 bends to be a loop shape. The first and second resisting arms 363, 365 are located at two sides of the spiral portion 361.

FIGS. 4 and 5 show that when the main portion 321 is assembled in the assembling recess 112 of the first housing 10, the two projecting blocks 322, the flange 323, and the projection 324 extend into the first housing 10 through the hole 113. The two projecting blocks 322 are positioned between the two protruding blocks 114 and each projecting block 322 abuts a corresponding protruding block 114 with the second axle holes 3221 aligned with the first axle holes 115. The spiral portion 361 is coiled around the shaft 38 and positioned between the two projecting blocks 322. Two ends of the shaft 38 extend through the second axle holes 3221 and the first axle holes 115. As such, the main portion 321 of the button 32 is able to rotate about the shaft 38. The first resisting arm 363 elastically resists the inner surface 1102 of the bottom wall 11. The second resisting arm 365 elastically resists the main portion 321 and is coiled around the projection 324, thereby applying a twisting force on the button 32 to force the button 32 to resist the bottom wall 11. In a natural state, the flange 323 elastically resists the inner surface 1102 of the bottom wall 11 under the twisting force of the elastic member 36.

Figure 6:
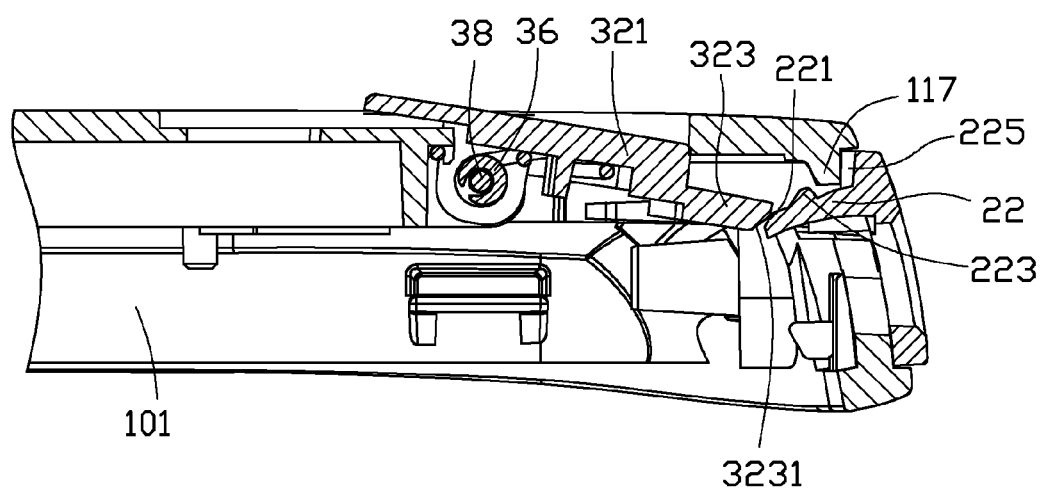
FIG. 6 is another cross-sectional view of the portable electronic device of FIG. 4 with the button pressed down.

FIGS. 4-6 show that in assembly, the main body 21 of the second housing 20 is received in the receiving recess 150. The latching tab 22 is inserted into the accommodating space 101 through the opening 1501 with the protrusion 223 latched in the concave portion 225. The two first hooks 23 are latched in the two latching holes 16. The two second hooks 25 are inserted into the accommodating space 101 to be latched by the two latching blocks 17. The main portion 321 of the button 32 is assembled in the assembling recess 112 of the first housing 10. The flange 323 extends into the first housing 10 through the hole 113. The second resisting arm 365 elastically resists the main portion 321. In a natural state, the flange 323 elastically resists the bottom wall 11 under the twisting force of the elastic member 36. The free end of the flange 323 having the first slanted surface 3231 is located above and overlaps the distal end of the latching tab 22 having the first slanted surface 221.

When the second housing 20 needs to be disassembled from the first housing 10, the button 32 is pressed toward the accommodating space 101 under a pressure overcoming the twisting force, causing the flange 323 to rotate about the shaft 38 to be away from the bottom wall 11. At this time, the second slanted surface 3231 of the flange 323 abuts against the first slanted surface 221 of the latching tab 22, thereby pushing the latching tab 22 to elastically bend away from the protruding bar 117 and move away from the flange 323 until the latching between the latching tab 22 and the protruding bar 117 is released. At this time, the elastic member 36 accumulates elastic force. Since the latching tab 22 and the protruding bar 117 is released, it is easy to release the latching between the two first hooks 23 and the end wall 15 and the latching between the two second hooks 25 and the two latching blocks 17. As such, the second housing 20 can be easily dissembled from the first housing 10. When the button 32 is released, the flange 323 reversely rotates to the resist the bottom wall 11 under the twisting force of the elastic member 36.

Although numerous characteristics and advantages of the exemplary disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A portable electronic device, comprising:
a first housing comprising a bottom wall and an end wall connected to and edge of the bottom wall; an outer surface of the bottom wall defines an assembling recess;
a second housing having a latching tab latched to the first housing; and
a releasing mechanism comprising:
a button;
an elastic member; and
a shaft;
wherein the button surrounds the shaft and is rotatably assembled to the first housing by the shaft, the elastic member is coiled around the shaft and elastically resists the button to apply an elastic force to enable the button resisting the first housing, when the button rotates about the shaft under a pressure overcoming the elastic force, the latching tab is pushed to release the latching tab and the second housing;
wherein a protruding bar protrudes from an inner surface of the bottom wall and is positioned between the assembling recess and the end wall; a protrusion protrudes from a substantially middle position of the latching tab, thereby forming a concave portion between the protrusion and the second housing; the protruding bar is detachably latched in the concave portion.

2. The portable electronic device of claim 1, wherein the button has a flange extending from an end, a distal end of the latching tab has a first slanted surface; a free end of the flange has a second slanted surface; the second slanted surface abuts against the first slanted surface when the button pushes the latching tab.

3. The portable electronic device of claim 2, wherein the free end of the flange overlaps the distal end of the latching tab.

4. The portable electronic device of claim 1, wherein the button includes a main portion and two opposite projecting blocks protruding the main portion; two opposite protruding blocks protrude from the first housing; each of the two protruding blocks defines a first axle hole; each of the two projecting blocks defines a second axle hole; the shaft extends through the second axle holes and the first axle holes to rotatably assemble the button to the first housing.

5. The portable electronic device of claim 4, wherein a hole is defined in a bottom of the assembling recess; the main portion is received in the assembling recess, the two projecting blocks and the flange extend into the first housing through the hole.

6. The portable electronic device of claim 5, wherein the end wall defines a receiving recess; a substantially center portion of a bottom of the receiving recess defines an opening; the second housing is assembled in the receiving recess; the latching tab is inserted through the opening to be detachably latched in the concave portion.

7. The portable electronic device of claim 1, wherein the elastic member is a torsion spring including a spiral portion, a first resisting arm connecting with the spiral portion, and second resisting arm connecting with the spiral portion; the spiral portion is coiled around the shaft; the first and second resisting arms are located at two sides of the spiral portion.

* * * * *